US005313518A

United States Patent [19]

Yamashita

[11] Patent Number: 5,313,518

[45] Date of Patent: May 17, 1994

[54] ELECTRONIC LOCKING DEVICES

[76] Inventor: Toshihiko Yamashita, 4-43 chome, Shibata, Kita-ku, Osaka 530, Japan

[21] Appl. No.: 768,620

[22] PCT Filed: Mar. 19, 1990

[86] PCT No.: PCT/GB90/00408

§ 371 Date: Nov. 4, 1991

§ 102(e) Date: Nov. 4, 1991

[87] PCT Pub. No.: WO90/11423

PCT Pub. Date: Oct. 4, 1990

[30] Foreign Application Priority Data

Mar. 28, 1989 [GB] United Kingdom ................ 8906983

[51] Int. Cl.5 ........................................... H04M 11/00

[52] U.S. Cl. .................................................. 379/102

[58] Field of Search ............................... 379/102-105, 379/90, 110, 457

[56] References Cited

U.S. PATENT DOCUMENTS

| | | | |
|---|---|---|---|
| 3,801,742 | 4/1974 | O'Brien et al. | 379/103 |
| 3,917,911 | 11/1975 | Lesher | 379/103 |
| 4,436,958 | 3/1984 | Hansen et al. | 379/103 |
| 4,887,078 | 12/1989 | Cho | 379/103 |

*Primary Examiner*—Wing F. Chan

*Attorney, Agent, or Firm*—Townsend and Townsend Khourie and Crew

[57] ABSTRACT

A method of unlocking a compartment such as a drawer in a desk where a telephone is provided on the desk, the telephone being of the type where a series of frequency tones are generated for dialing a number. The user places the handset of the telephone near a microphone receiver and dials a preset sequence of numbers on the telephone. The sound output from the handset is received by the microphone receiver, decoded and compared in memory with a preset code and if valid the lock is released to allow the drawer to be opened.

7 Claims, 3 Drawing Sheets

ELECTRONIC LOCKING DEVICES

BACKGROUND OF THE INVENTION

This invention relates to electronic locking devices. In particular the invention relates to a simple device and method for locking drawers, doors or other closable compartments in furniture such as office desks. Modern telephones which are connected to electronic switching exchanges produce a tone whose frequency depends upon the number dialed. When dialing a number in this way a series of tones are supplied along the telephone line and the tones are reproduced by the ear piece of the telephone. The frequencies of the tones produced are of known internationally accepted values.

SUMMARY OF THE INVENTION

We have now realized that those output tones can be used in a novel manner to control a lock for a lockable compartment in a piece of furniture on which the telephone rests, e.g. an office desk is typical.

According to one aspect of the invention there is provided a method of releasing a lockable compartment in a piece of furniture, in which the user places a telephone handset near a sound receiver and dials on the telephone a coded number. The resulting tones output produced by the telephone is received by the sound receiver, decoded, and compared with a preselected code for releasing the lock. The lock is released if the said resulting tones output corresponds with the preselected code.

Also according to the invention there is provided a lock release for a closable and lockable compartment in a piece of furniture comprising a microphone capable of receiving the tones of a telephone during dialing and a decoder for receiving the output from the microphone and converting preset frequency tones to a binary data signal output. Comparing means compare the binary data signal output with preset data corresponding to a valid sequence of tones and provide an output release signal if the comparison is valid. The output signal causes a mechanical releasing means to release the lock.

The invention also extends to a piece of furniture such as an office desk having a lockable compartment closed by such a lock release.

The invention provides a very simple way of releasing a lock and is very convenient since a separate key, which can easily be misplaced, is not necessary. Instead, the invention uses the output tones of a telephone which is normally readily available. The lock is secure, however, since the user can preset the lock to accept a particular code number unique to him and known only to him, e.g. a series of four digits. All the user has to do is place the telephone earpiece near the microphone and dial the series of four digits on the telephone to release the lock.

The microphone and decoder will be adapted to receive and decode frequencies within the well known range of frequencies corresponding to the dialing tones of electronic switching telephone exchanges.

BRIEF DESCRIPTION OF THE DRAWINGS

The invention will now be described, by way of example, with reference to the accompanying drawings, in which.

BRIEF DESCRIPTION OF THE PREFERRED EMBODIMENT

Figure 1:
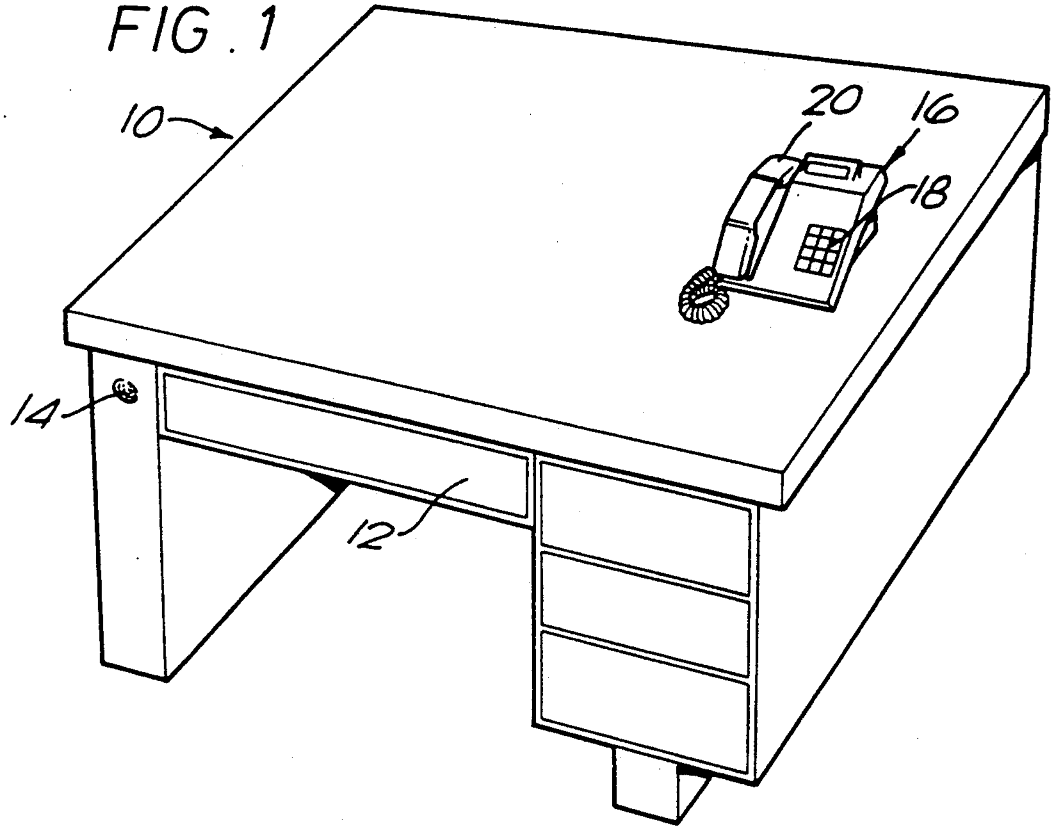
FIG. 1 is a diagram of an office desk having a drawer which can be opened according to the invention.

As shown in FIG. 1, an office desk 10 has a locked drawer 12. The lock (not shown in FIG. 1) for this is normally closed, but can be released as will be described. A small microphone 14 is incorporated into the body of the desk 10.

Resting on the desk is a telephone 16 of the type which produces a series of tones when dialing a number, i.e. a different tone frequency corresponds to each number pressed on the telephone dial 18 (these frequencies are well known and internationally recognized.)

The telephone 16 has a handset 20. When the drawer 12 is to be unlocked, the handset is taken from the telephone and the ear piece placed close to the microphone 14 so that the dialed tones are received by it. The user then presses a known preselected code on the telephone dial, e.g. a series of four digits. Providing these are the correct digits in the correct order, the drawer lock will release and the drawer 12 can then be opened.

Figure 2:
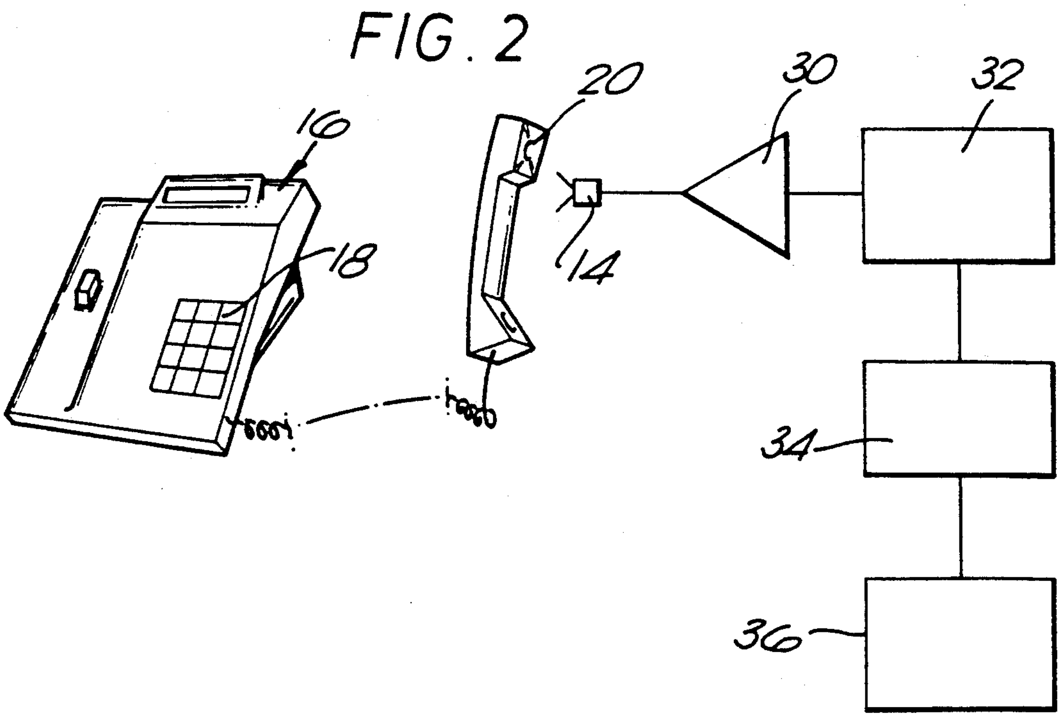
FIG. 2 is a block diagram showing the main components of the invention.

Referring now to FIG. 2, the signal from the microphone 14 is first of all amplified in a simple amplifier 30 and the output fed to a tone decoder circuit 32 to analyze the output signal from the microphone. This circuit converts a particular tone frequency detected to a binary data signal output. The binary data signals are then passed to a CPU circuit 34 which checks the binary data signals against a preset memory and in the event that they agree the output passes to a mechanical lock release mechanism 36.

Figure 3:
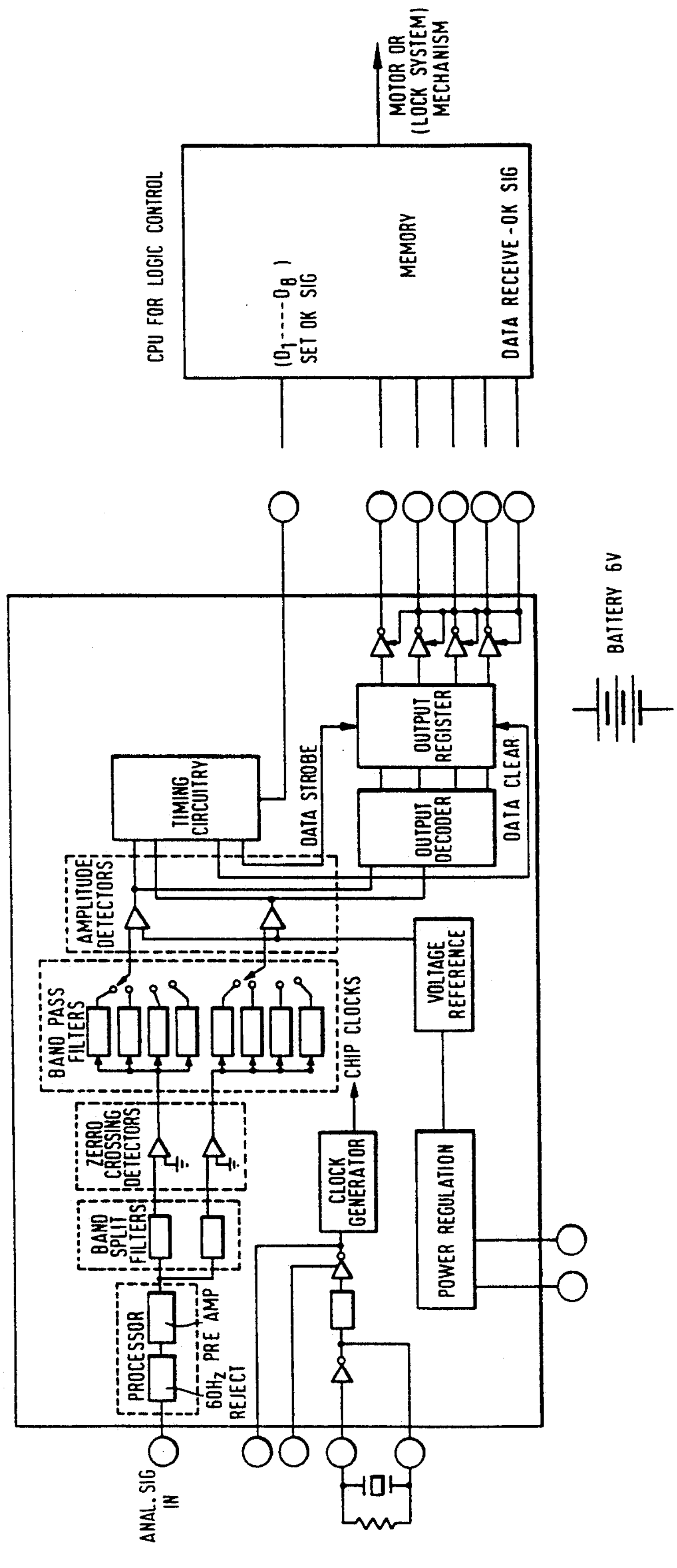
FIG. 3 is a more detailed diagram of the decoder and lock release mechanism.

The decoder circuit 32 is shown in more detail in FIG. 3. This is conveniently in the form of an IC chip of the type shown as SSi202 of SSi203 and available from Silicon Systems.

In the circuit 32, the input signals from the microphone 16 pass through various band pass filters and outputs are provided in the form of either a high impedance open circuit or a low impedance, i.e. binary outputs. There are four outputs which can given a binary 4 bit output corresponding to a digit according to the following table:

| | Output on pin | | | |
|---|---|---|---|---|
| Digit | D8 | D4 | D2 | D1 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 0 | 1 | 0 | 1 | 0 |

Figure 4:
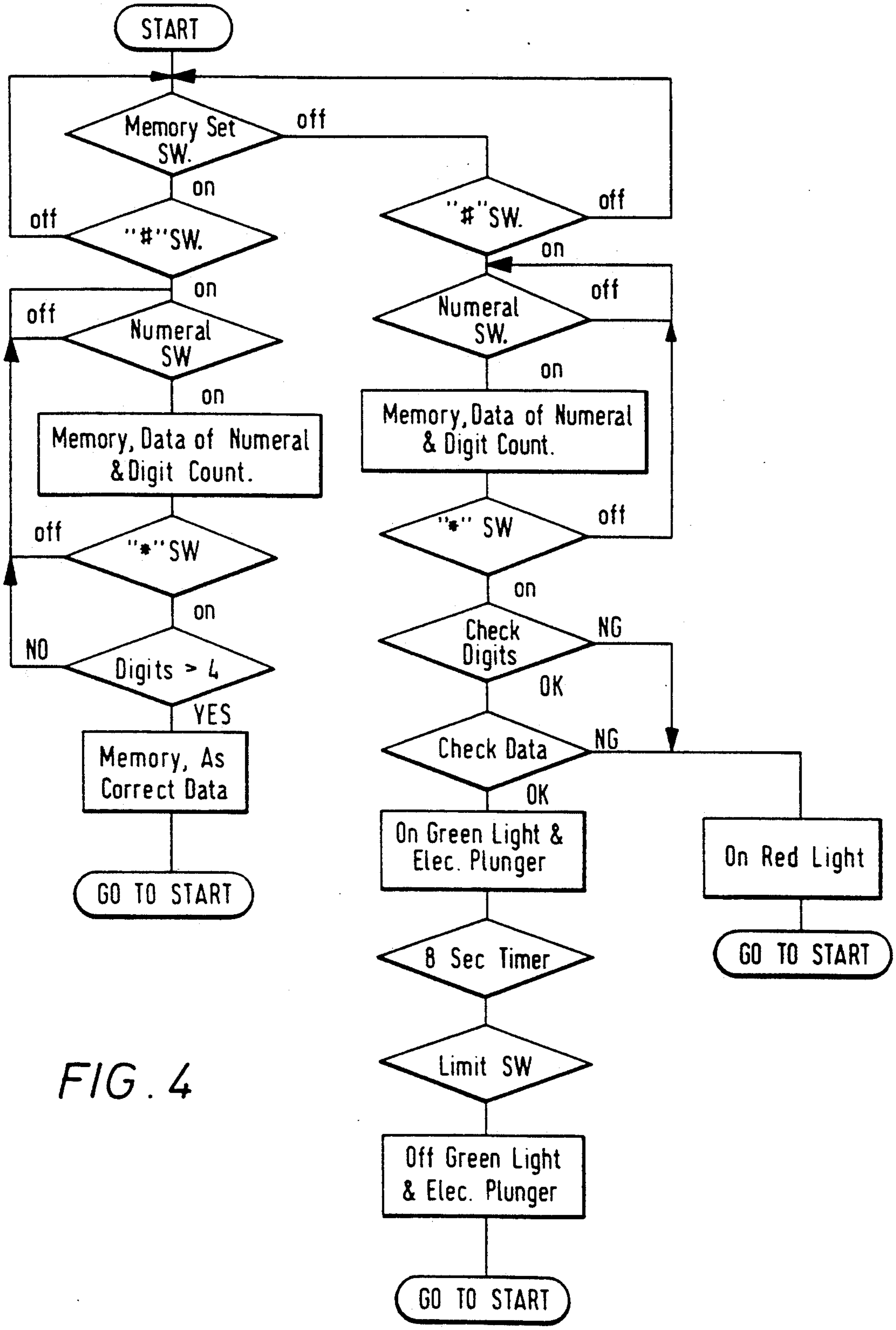
FIG. 4 is a flow chart illustrating the operation of a lock according to the invention.

Thus, when the tone of digit 1 is detected upon pressing the button number 1 on the telephone, the data output to the circuit 34 will be 0001 and so on. The circuit 34 includes a memory and the series of data outputs are checked against the number code stored in the memory according to the flow sheet of FIG. 4. If the series of numbers is correct an output signal to actuate the lock release mechanism 36 is provided.

The lock release mechanism 36 can be an electric motor or an electric solenoid driving a mechanical bolt to withdraw the bolt when actuated. The mechanical bolt can be largely conventional and include a bolt which engages a recess to hold the drawer shut, the bolt being resiliently urged to a locking position so that the drawer can be shut without withdrawing the bolt. As can also be seen from FIG. 4, this bolt is withdrawn for only a preset period of time after which the bolt will again be returned to the locking position to avoid the drawer being left unlocked.

I claim:

1. A method for releasing a lock comprising the steps of:

providing a piece of furniture having a lockable compartment;

placing a handset of a telephone near a sound receiver attached to the piece of furniture;

dialing a coded number on the telephone so that audible tones corresponding to the coded number are produced by the telephone;

receiving the audible tones with the sound receiver;

comparing the audible tones with a preselected code for releasing the lock; and releasing the lock if the audible tones correspond with the preselected code.

2. A method as claimed in claim 1 wherein the receiving step is carried out by a microphone.

3. A method as claimed in claim 1 wherein the comparing step is carried out by converting each audible tone into a binary signal, each binary signal being compared with preset binary signals in a memory means, the memory means producing an output signal to release the lock when the binary signals are equivalent to the preset binary signals.

4. A method as claimed in claim 1 wherein the releasing step is carried out by a mechanical bolt engaging a recess and an electrically driven release means that withdraws the bolt when the output signal is produced.

5. A piece of furniture having a lockable compartment comprising:

a telephone disposed near the lockable compartment, the telephone adapted to produce a different audible tone for each number dialed;

a microphone fixed to the piece of furniture and positioned to receive the audible tones from the telephone; and a lock release attached to the lockable compartment for unlocking the lockable compartment comprising:

a decoder adapted to receive the audible tones from the microphone and convert the audible tones into corresponding binary signals;

means for comparing the binary signals with a preset code;

means for producing a release signal if the binary signals are equivalent to the preset code; and means for mechanically releasing the lock when the release signal is produced.

6. The device of claim 5 wherein the piece of furniture is an office desk with a flat surface and the lockable compartment is a desk drawer, the telephone resting on the flat surface of the desk.

7. The device of claim 5 wherein the releasing means comprises a mechanical bolt engaging a recess and an electrically driven release means that withdraws the bolt when the release signal is produced.

* * * * *